United States Patent
Alshaibani

(10) Patent No.: US 12,152,437 B2
(45) Date of Patent: Nov. 26, 2024

(54) METHOD FOR LIGHT DIFFUSION THROUGH A WINDOW

(71) Applicant: Imam Abdulrahman Bin Faisal University, Dammam (SA)

(72) Inventor: Khalid Asker Alshaibani, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 18/490,813

(22) Filed: Oct. 20, 2023

(65) Prior Publication Data

US 2024/0052697 A1 Feb. 15, 2024

Related U.S. Application Data

(63) Continuation of application No. 18/337,120, filed on Jun. 19, 2023, now Pat. No. 11,834,901, which is a
(Continued)

(51) Int. Cl.
*E06B 9/386* (2006.01)
*H02S 20/26* (2014.01)
(Continued)

(52) U.S. Cl.
CPC .............. *E06B 9/386* (2013.01); *H02S 20/26* (2014.12); *H02S 20/30* (2014.12); *H02S 30/20* (2014.12);
(Continued)

(58) Field of Classification Search
None
See application file for complete search history.

(56) References Cited

U.S. PATENT DOCUMENTS

| 2,595,905 A | 5/1952 | Telkes |
| 2,651,085 A | 9/1953 | Kopp |

(Continued)

FOREIGN PATENT DOCUMENTS

| CN | 101787849 B | 1/2012 |
| CN | 102865030 B | 4/2016 |
| CN | 104533268 B | 8/2016 |

OTHER PUBLICATIONS

Eldredge; These solar panel window blinds generate energy while blocking rays ; Curbed ; May 12, 2017 ; 3 Pages.

*Primary Examiner* — Phi D A
(74) *Attorney, Agent, or Firm* — Oblon, McClelland, Maier & Neustadt, L.L.P.

(57) ABSTRACT

A solar powered smart window includes a light diffuser configured to convert an incident direct solar radiation to a diffusive light toward interior direction, a light diffuser positioner, a driving mechanism, a solar panel, and a control unit. The control unit moved the light diffuser from a predetermined opened position to a closed position and to hold the light diffuser at the closed position with latch mechanism, when the output power of the solar panel exceeds a threshold for over a duration time. The controller releases the latch mechanism and to cause the light diffuser to return to the predetermined opened position when the output power lowers below threshold for over the duration time. A method includes storing a predetermined condition, monitoring the output power, comparing the output power with the predetermined conditions, making decision whether a positional transition is necessary, and causing the transitional transition or maintaining current position.

12 Claims, 8 Drawing Sheets

Related U.S. Application Data continuation of application No. 18/155,104, filed on Jan. 17, 2023, now Pat. No. 11,746,592, which is a continuation of application No. 16/414,262, filed on May 16, 2019, now Pat. No. 11,603,704.

(51) Int. Cl.
  *H02S 20/30* (2014.01)
  *H02S 30/20* (2014.01)
  *H02S 40/32* (2014.01)
  *E06B 9/24* (2006.01)

(52) U.S. Cl.
  CPC ...... *H02S 40/32* (2014.12); *E06B 2009/2476* (2013.01)

(56) References Cited

U.S. PATENT DOCUMENTS

| | | | |
|---|---|---|---|
| 3,971,359 A | 7/1976 | Bourne | |
| 4,159,707 A | 7/1979 | Miquel | |
| 4,279,240 A | 7/1981 | Artusy | |
| 4,410,757 A | 10/1983 | Stamminger | |
| 4,436,084 A | 3/1984 | Carlston | |
| 4,452,228 A | 6/1984 | Meyer | |
| 4,658,806 A | 4/1987 | Boozer | |
| 4,722,325 A | 2/1988 | Fulkerson | |
| 6,029,656 A | 2/2000 | Schwarz | |
| 6,134,842 A | 10/2000 | Cheng | |
| 6,528,782 B1 * | 3/2003 | Zhang | B60J 3/04 250/226 |
| 7,178,291 B2 | 2/2007 | Vasquez | |
| 8,413,705 B2 | 4/2013 | Castel | |
| 9,057,535 B2 | 6/2015 | Frazier | |
| 9,217,582 B2 | 12/2015 | Frazier | |
| 9,410,365 B2 | 8/2016 | Hashemi | |
| 9,746,148 B2 | 8/2017 | Whitehead | |
| 10,774,579 B2 | 9/2020 | Harrison | |
| 11,603,704 B2 | 3/2023 | Alshaibani | |
| 11,746,592 B2 | 9/2023 | Alshaibani | |
| 2008/0170941 A1 | 7/2008 | Ghosh | |
| 2009/0142874 A1 | 6/2009 | Arai | |
| 2011/0036511 A1 | 2/2011 | Dempwolffe | |
| 2011/0056135 A1 * | 3/2011 | Cochran, Jr. | E06B 9/24 49/63 |
| 2011/0067748 A1 | 3/2011 | Pfeiffer | |
| 2012/0057225 A1 * | 3/2012 | Zakirullin | E06B 9/24 359/359 |
| 2013/0265642 A1 * | 10/2013 | Vasylyev | G02B 19/0028 264/2.7 |
| 2014/0055859 A1 * | 2/2014 | Vasylyev | G02B 5/0268 359/593 |
| 2014/0116497 A1 | 5/2014 | Sanders | |
| 2015/0285454 A1 * | 10/2015 | Aizenberg | E06B 9/24 29/428 |
| 2016/0025288 A1 * | 1/2016 | Vasylyev | F21V 3/06 359/595 |
| 2016/0341383 A1 * | 11/2016 | Gardiner | F21S 11/007 |
| 2017/0130520 A1 | 5/2017 | Cornelissen | |
| 2017/0138124 A1 * | 5/2017 | Kanno | E06B 9/386 |
| 2018/0216346 A1 * | 8/2018 | Gelbaum | E04D 13/033 |
| 2018/0284555 A1 * | 10/2018 | Klawuhn | G02F 1/133504 |
| 2018/0291681 A1 * | 10/2018 | Kanno | E06B 9/32 |
| 2018/0351503 A1 * | 12/2018 | Ozcan | H02S 40/20 |
| 2019/0383091 A1 | 12/2019 | Wilson | |
| 2020/0091363 A1 | 3/2020 | Gupta | |
| 2020/0270867 A1 | 8/2020 | Rillie | |
| 2020/0309337 A1 * | 10/2020 | Yui | G02B 5/00 |
| 2020/0362626 A1 * | 11/2020 | Alshaibani | E06B 9/386 |
| 2022/0107540 A1 | 4/2022 | Lin | |

* cited by examiner

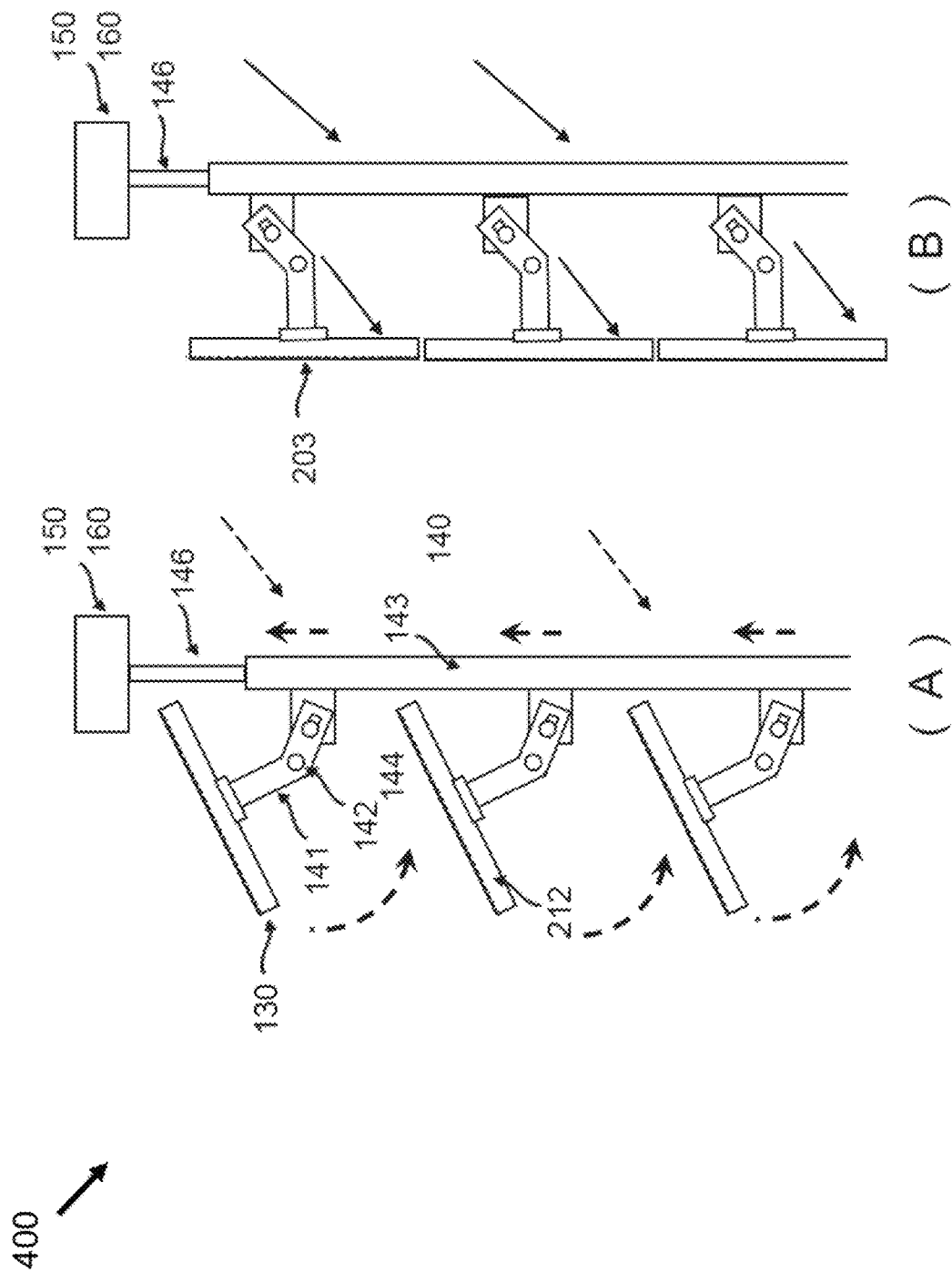

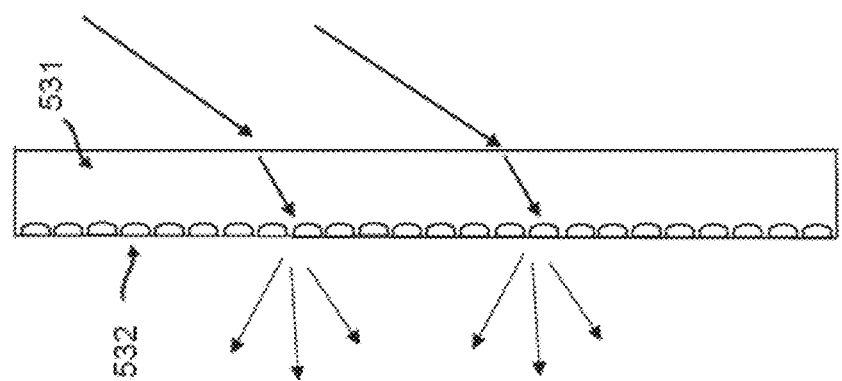
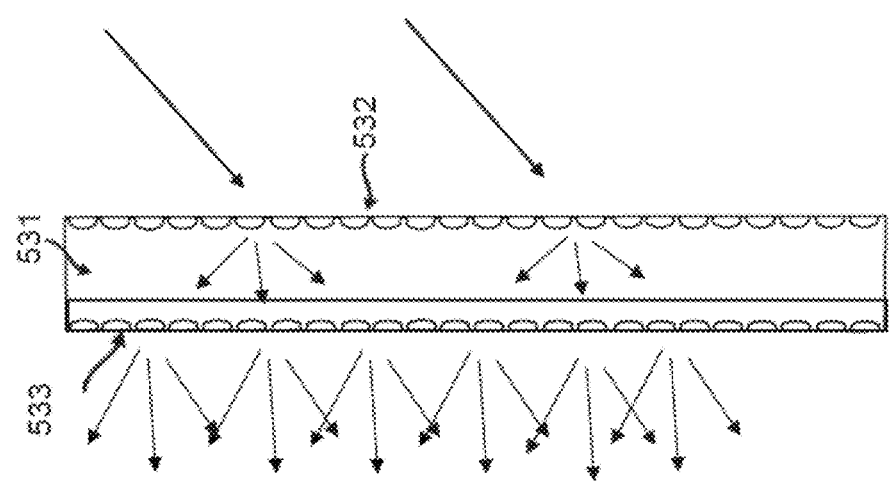

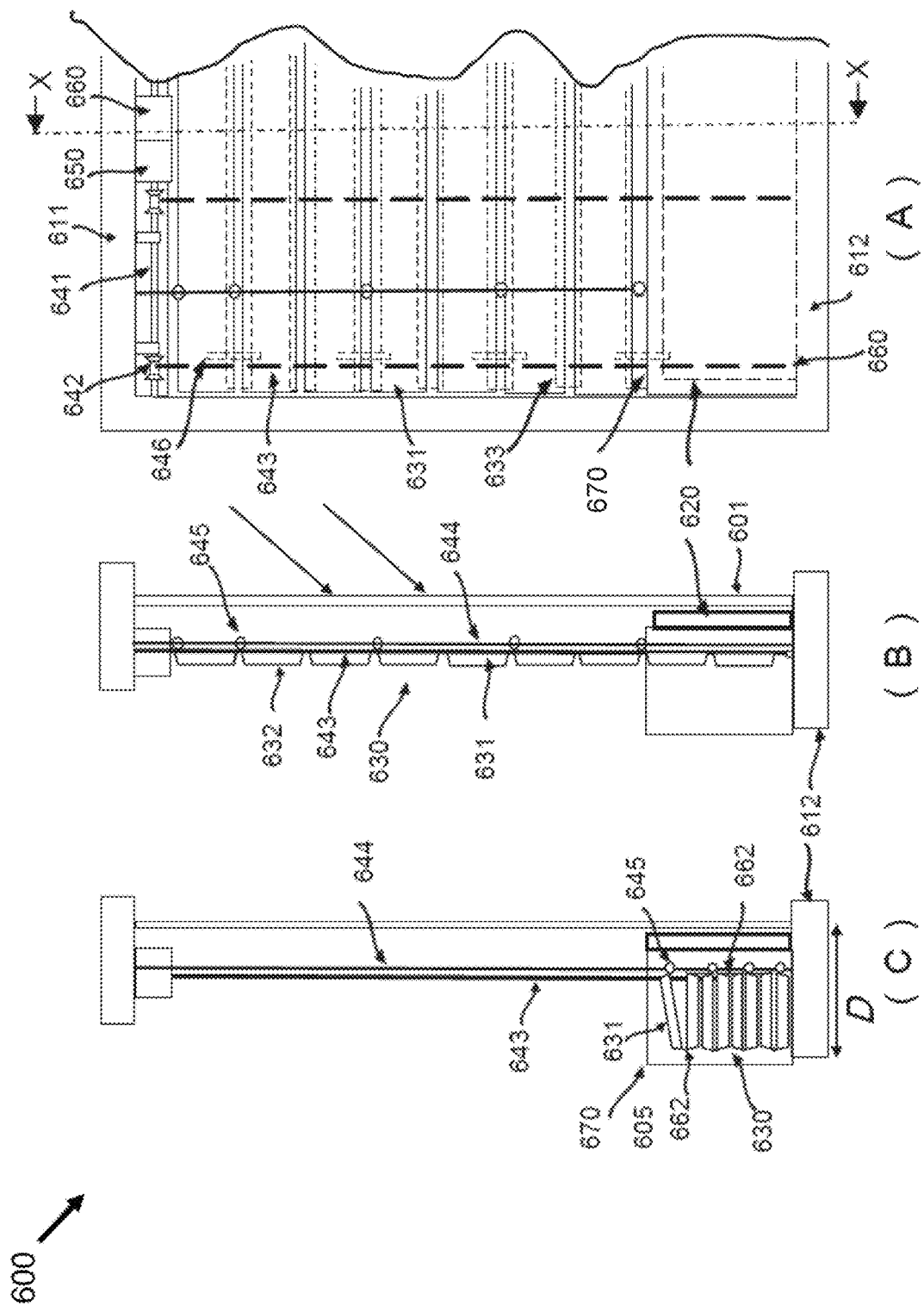

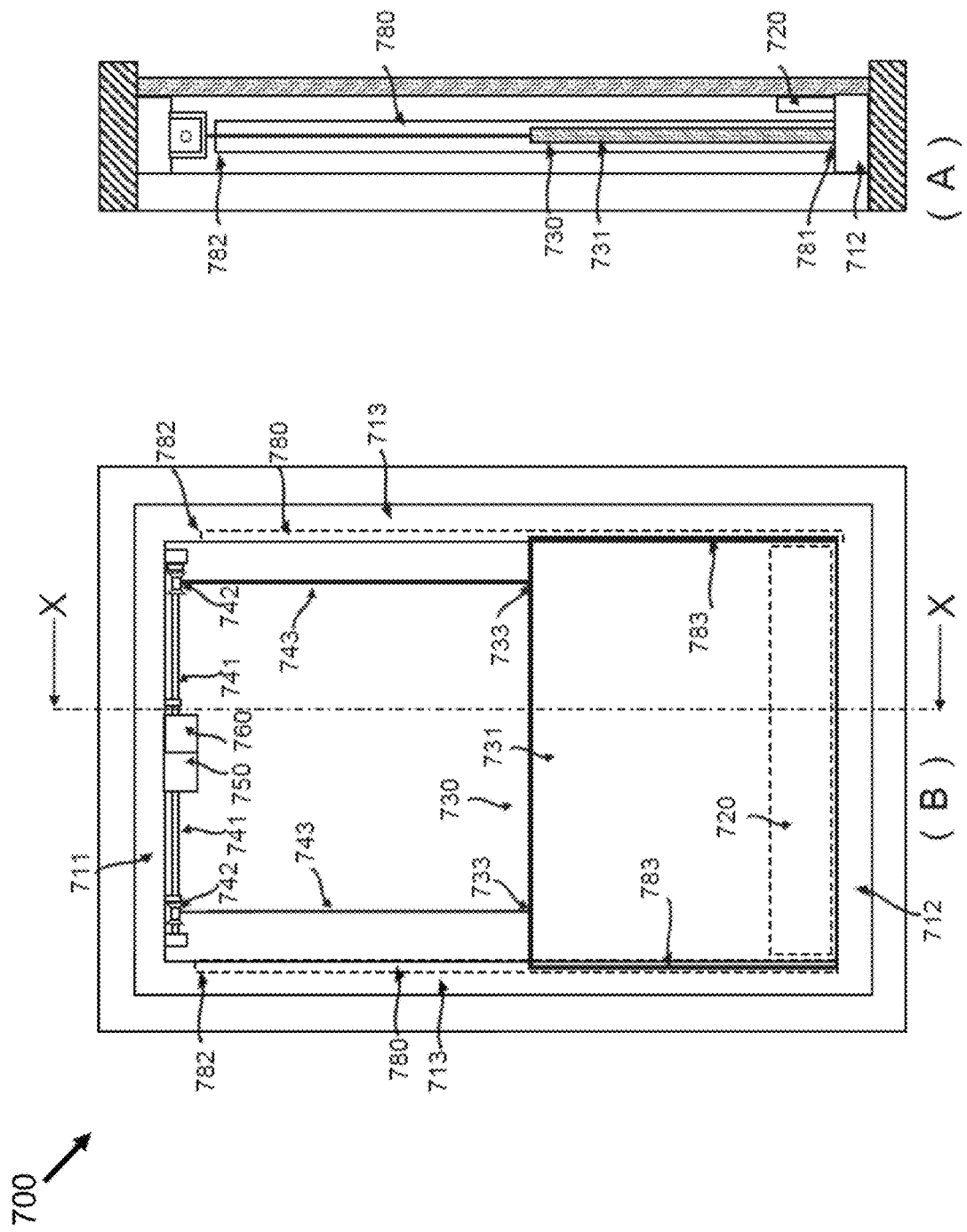

METHOD FOR LIGHT DIFFUSION THROUGH A WINDOW

CROSS-REFERENCE TO RELATED APPLICATIONS

The present application is a Continuation of U.S. application Ser. No. 18/337,120, now allowed, having a filing date of Jun. 19, 2023 which is a Continuation of U.S. application Ser. No. 18/155,104, now U.S. Pat. No. 11,746,592, having a filing date of Jan. 17, 2023 which is a Continuation of U.S. application Ser. No. 16/414,262, now U.S. Pat. No. 11,603,704, having a filing date of May 16, 2019.

BACKGROUND

Technical Field

The present disclosure is directed to smart windows with automated window coverings and powered by solar panels.

Description of the Related Art

Growth in population and the enhancement in building services and comfort levels have increased energy consumption in buildings. Buildings and construction together account for 36% of global energy use. In a typical office building, artificial lighting consumes the bulk of the energy followed by cooling and heating operations. See, *International Energy Agency, Global Status Report* 2017, and *Key World Energy Statistics* 2014. Office buildings have a relatively high proportion of lighting energy consumption per unit area due to their functional and operational requirements as described in H. Hens, "Thermal comfort in office buildings: two case studies commented," *Build. Environ.* 44 (2009) 1399-1408.

Daylight received through windows can significantly reduce lighting energy consumption in office buildings. See M. T. Ke, C.-H. Yeh, J.-T. Jian, "Analysis of building energy consumption parameter and energy savings measurement and verification by applying Quest software," *Energy Build.* 61 (2013) 100-107, the entire contents of which are incorporated herein by reference. Daylighting provides a pleasant and attractive indoor environment that can foster higher productivity and performance as described in P. Plympton, S. Conway, K. Epstein, "Daylighting in Schools: Improving Student Performance and Health at a Price Schools Can Afford," *National Renewable Energy Laboratory Report*, CP-550-28059, Golden, CO, 2000.

Realizing an indoor environment with visual comfort by admitting daylight through windows requires both a) control of interior brightness and b) suppression of glare. The former can be realized by adjusting interior electric lighting depending on the amount of daylight admitted thorough windows. The latter requires blocking direct solar radiation which is known to be the primary cause of glare. See U.S. Pat. No. 5,663,621 to Popat, the entire contents of which are incorporated herein by reference. Popat analyzed then known approaches for automatic window coverings or "smart windows," and pointed out their disadvantages: the brightness regulating systems merely regulate brightness but do not block direct solar radiation; glare blocking systems require modifications of conventional louvers and prevent independent adjustment of transmitted daylight; integrated systems either do not address preventing glare caused by the direct solar radiation, or require complicate systems including sensors and interconnection to lighting system. Based on such analysis Popat disclosed a controlling method of an electronically controlled window covering which can block direct solar radiation while admitting substantial diffuse illumination, utilizing a controller which pre-stored data defining a desired setting of louver angle as a function of the time of the day and the day of the year, for the prevailing latitude, longitude, and window azimuth orientation, and based on measured results on the exterior brightness.

On the other hand, renewable energy deployment and policies to modernize electricity production and consumption are propelling numerous advances in energy efficient buildings. Renewable energy includes solar and wind power, biomass and so on. Inherent loss due to transmitting power over long distances makes onsite power generation attractive, especially solar power. Solar panels may be placed on the roof of a residential home, or commercial building, and connected to the building's or the municipal power grid, thereby providing electricity for onsite consumption.

Several U.S. patents disclose apparatus which integrate solar cells into window coverings. For example, U.S. Pat. Pub. No. 2014/0116497A1 discloses an onsite solar power generation apparatus configured as an interior window covering. The electric power generated by the solar cells is converted to AC power and provided to the building power grid. U.S. Pat. No. 7,617,857 discloses venetian blinds with solar cells mounted on top surfaces of the controller and an adjustment mechanism of the slat position and orientation to control the amount of light the venetian blinds permits to pass inside. The solar cells are configured to output power to a battery which then is configured to drive LEDs attached to the slats for providing indoor lighting.

Chinese Pat. Pub. CN102865030B disclosed a solar driven shutter with solar cells mounted on the louver, a drive mechanism for turning and lifting movement of the louvers using the collected solar energy, and a control device configured to operate based on a light sensor output and a pre-installed light intensity.

On the other hand, a diffuser (also called a light diffuser or optical diffuser) is known in optics field as a material that diffuses or scatters light to transmit soft light. A diffractive diffuser that exploits the principles of diffraction and refraction with micro surface structures has been developed for engineering a specific spatial-configuration and intensity profile of light sources. The diffractive diffusers are commonly used in commercially available LED illumination systems. Usually, the diffuser material is GaN or fused silica with processed rough surfaces. Even a laser beam is reported to be converted to a divergent diffused light. See for example, https://en.wikipedia.org/wiki/Diffuser_(optics) and http://www.agc.com/en/products/electoric/detail/doe_and_diffuser.html, the entire contents of which are incorporated herein by reference.

Conventional systems such as those described above still do not adequately address the needs and demands of modern energy efficient buildings which are ideally energy neutral with respect to energy consumption/generation for lighting and/or heating/cooling. Accordingly it is one object of the present disclosure to provide a system and method for controlling lightning using a smart window that receives electrical power from solar cells integrated thereon.

SUMMARY

In an exemplary implementation, a solar powered smart window for a window of a building includes a light diffuser configured to convert an incident direct solar radiation to a diffusive light toward interior direction and situated at a predetermined opened position, a light diffuser positioner, a driving mechanism including a motor and a transmission mechanism, a solar panel placed at a proximity of the window, a control unit configured to receive and monitor an output power of the solar panel and to compare with a predetermined threshold output power of the solar panel. The controller is further configured to move the light diffuser to a closed position via the light diffuser positioner and the driving mechanism, and to hold the light diffuser at the closed position with a latch mechanism, when the output power of the solar panel is not smaller than the predetermined output power for longer than a predetermined duration time while the light diffuser is at the predetermined opened position. The controller is further configured to release the latch mechanism and to cause the light diffuser to return to the predetermined opened position when the output power of the solar panel lowers to a value smaller than the predetermined output power for longer than the predetermined duration time while the light diffuser is at the closed position.

In another exemplary embodiment, a method includes storing a predetermined condition to cause a positional transition of the light diffuser and a positional information of a predetermined opened position as an initial condition; monitoring the output power of the solar panel; comparing the output power of the solar panel with a predetermined value; making decision whether a positional transition is necessary for the light diffuser; and either a) causing a transition of the light diffuser from the predetermined opened position to a closed position via the driving mechanism, when the output power of the solar panel is not smaller than the predetermined value for longer than a predetermined time duration while the light diffuser is at the predetermined opened position; b) causing a return of the light diffuser from the closed position to the predetermined opened position when the output power of the solar panel is smaller than the predetermined value for longer than the predetermined time duration, or c) maintaining a current position when either of conditions for above a) or b) is not satisfied.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 4A illustrates schematically the predetermined opened position (A) of the light diffuser in the embodiment of FIG. 1;

FIG. 4B illustrates schematically the predetermined closed position (B) of the light diffuser in the embodiment of FIG. 1;

FIG. 5A illustrates schematically a structure and operation principle of the light diffuser for a certain embodiment of the present disclosure;

FIG. 5B illustrates schematically a structure and operation principle of the light diffuser for a certain embodiment of the present disclosure;

FIG. 6A illustrates schematically a structure of the smart window covering according to a certain embodiment of the present disclosure as (A) a front view from interior at a closed position;

FIG. 6B illustrates schematically a structure of the smart window covering according to a certain embodiment of the present disclosure as (B) a side view at the closed position;

FIG. 6C illustrates schematically a structure of the smart window covering according to a certain embodiment of the present disclosure as (C) a side view at the predetermined opened position;

FIG. 7A illustrates schematically a smart window covering according to a certain embodiment the present disclosure as (A) a front view from interior;

FIG. 7B illustrates schematically a smart window covering according to a certain embodiment the present disclosure as (B) a side view.

DETAILED DESCRIPTION

Figure 1B:
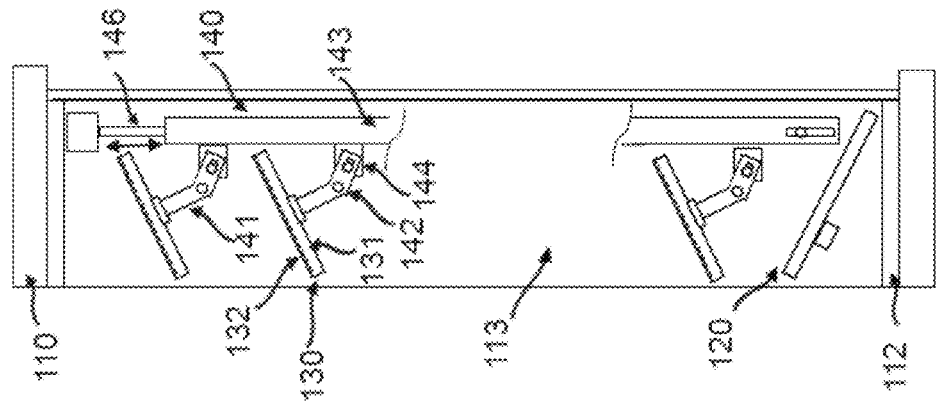
FIG. 1B illustrates schematically a structure of a smart window covering shown in a side view according to a certain embodiment of the present disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a system of solar powered smart window covering for buildings and method for controlling the same. As briefed in the background, conventional approaches of integrating solar cells into automatic window coverings r utilize solar power to drive an adjusting mechanism of louver angle and position to control the amount of light admitted into the interior. However, they do not provide solutions to maximize the diffused light admitted into the interior under condition of blocking direct solar radiation. It is understood that conventional opaque metal venetian louvers aligned at an angle to block direct solar radiation and not to block any diffusive light when viewed at an interior location close to the window, for example, in fact do fully block the diffusive light when viewed from an interior location far from the window.

Accordingly, one embodiment of the present disclosure provides a solution for a solar powered window covering which can maximize the diffusive light admitted into the interior while simultaneously blocking direct solar radiation, and which therefore can contribute to reducing the consumption of energy for lighting in buildings. Another embodiment of the present disclosure provides a solution for a solar powered window covering which can control the amount of infra-red radiation admitted through the window that is accompanied with the solar radiation. This solution also contributes to reducing energy for cooling interior air in hot climates, seasons or areas.

Figure 1A:
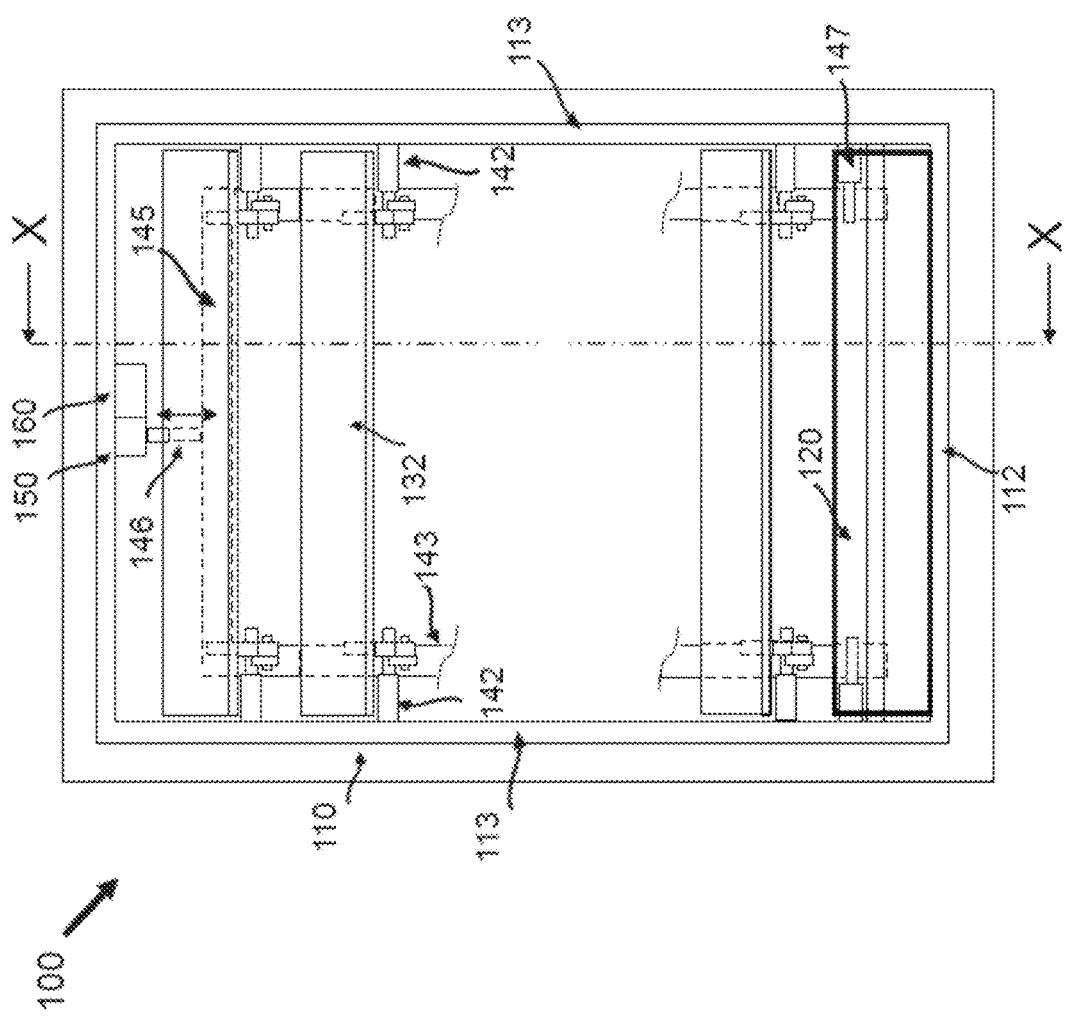
FIG. 1A illustrates schematically a structure of a smart window covering shown in a front view according to a certain embodiment of the present disclosure.

FIG. 1 illustrates schematically a structure of a smart window covering 100 according to an embodiment of the present disclosure. Here (A) illustrates a front view from interior side and (B), a left side view at section X-X'. The smart window covering 100 according to the embodiment includes a solar panel 120, a light diffuser 130, a light diffuser positioner 140, a driving mechanism 150, and a control unit 160.

The smart window covering 100 may include a frame 110 configured to be attached to a window frame and including an upper horizontal frame 111, a bottom horizontal frame 112, and a pair of side frames 113. The frame 110 may be substituted by a window frame of a building. The solar panel 120 is attached to a proximity of the frame of the window, here in the embodiment, mounted on the bottom horizontal frame 112.

The light diffuser 130 includes a base plate 131 transparent for visible light; and a light diffusing element 132 which is configured to convert an incident direct solar radiation to a diffusive light toward interior. The light diffuser is configured to stay at a predetermined opened position initially and to move to a closed position when predetermined conditions are satisfied. The light diffuser is configured to block direct solar radiation and converts to the diffusive light at the closed position, as detailed in FIG. 2. The light diffuser 130 is further configured to return to the predetermined opened position when certain conditions are satisfied; namely when there is no need of blocking the direct solar radiation.

The light diffuser positioner 140 is configured to move the light diffuser 130 between the predetermined opened position and the closed position, where the light diffuser positioner 140 is configured to be driven by the driving mechanism 150 under a control of the control unit 160. The light diffuser positioner 140 includes a supporting member 141 comprising a rigid material, a pair of pin shafts 142 embedded into the pair of side frame 113, a pair of vertical rods 143 with a plurality of side ports 144, an upper horizontal solid rod 145 connecting the pair of vertical solid rods at upper ends thereof, and a center vertical connection member 146 made of a solid rod or a string connecting the upper horizontal solid rod 145 at a center portion of the upper horizontal sold rod 145 with the driving mechanism 150. An end of the supporting member 141 is perpendicularly fixed to a base plate 131 of the light diffuser 130, where the supporting member 141 is rotatably attached to one of a pair of side frames 113 with a pin shaft 142 perpendicularly embedded into the one of the pair of side frames 113 at a portion between both ends of the supporting member 141. The other end of the supporting member 141 is connected rotatably and slidably to one of the plurality of side ports 144 of the vertical solid rod 143.

Each of the pair of vertical solid rods 143 may be vertically slidably connected to each of the pair of side frames 113 at around a bottom end portion of the each of pair of the vertical solid rods 143 with one of a pair of pin shafts 147 perpendicularly embedded into each of the pair of side frames 113.

The driving mechanism 150 of the light diffuser positioner includes a motor 151, a latch mechanism 152 to latch a motion of the driving mechanism, and a transmission mechanism 153 to transmit the motion of the motor 151 to the light diffuser positioner 140.

The control unit 160 is configured to move the light diffuser 130 to the closed position via the light diffuser positioner 140 and to hold the light diffuser 130 at the closed position using the latch mechanism 152, when the output power of the solar panel 120 is not smaller than the predetermined output power for longer than the predetermined duration time while the light diffuser is at the predetermined opened position. On the other hand, the control unit 160 is also configured to release the latch mechanism and to cause the light diffuser 130 to return to the predetermined opened position when the output power of the solar panel 120 lowers to a value smaller than the predetermined output power for longer than the predetermined duration time while the light diffuser 130 is at the closed position.

Figure 2:
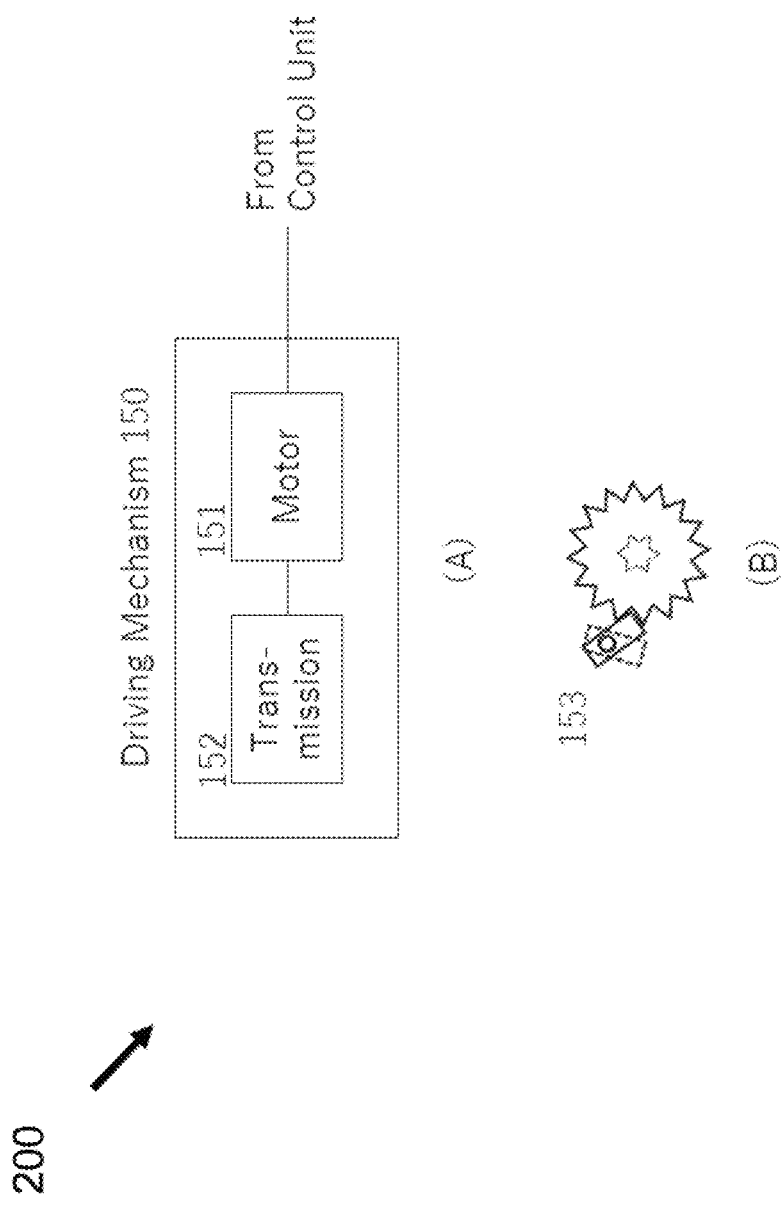
FIG. 2 illustrates schematically an exemplified block diagram of a driving mechanism (A) and a latch mechanism (B) of the smart window covering according to the embodiment of the present disclosure.

FIG. 2 illustrates schematically an exemplified block diagram of a driving mechanism (A) and a latch mechanism (B) of the smart window covering according to an embodiment of the present disclosure. The driving mechanism 150 includes a motor 151 and a transmission mechanism 152. The motor 151 may be a conventional axial rotation motor or a linear motor. The transmission mechanism 152 includes either one of a gear transmission or a belt transmission, and a latch mechanism 153 configured to hold a motion of the driving mechanism being electrically controlled, as illustrated in FIG. 2 (B).

Figure 3:
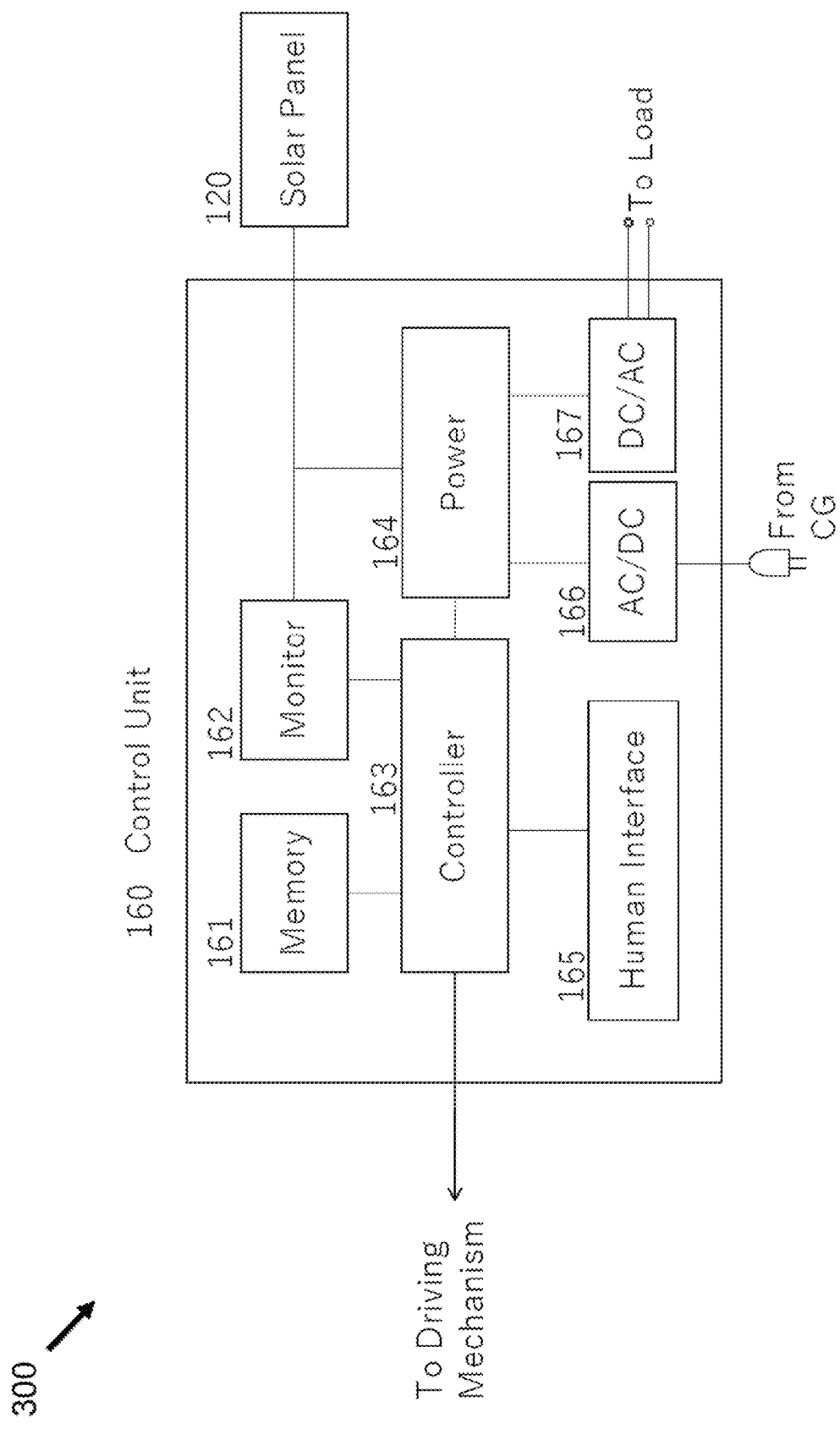
FIG. 3 illustrates an exemplified block diagram of the control unit 160 of the smart window covering of the embodiment of the present disclosure.

FIG. 3 illustrates an exemplified block diagram of the control unit 160 of the smart window covering of the embodiment of the present disclosure. The control unit 160 includes a memory 161, a monitor 162 of the output power from the solar panel 120, a controller 163, a power source 164, and a human interface. The memory 161 is configured to store a predetermined threshold output power of the solar panel, a predetermined duration time, and a present position of the light diffuser. The monitor 162 is configured to receive an output power from the solar panel 120 and send a monitor signal to the controller 163. The controller 163 is configured to control the driving mechanism. The power source 164 is configured to supply an electric power required for an operation of the smart window covering. The human interface 165 is configured to accept an input for the conditions to be predetermined. The controller may be further configured to manage receiving the output power from the solar panel 120 and charging the output power to the power source 164. The power source may be constituted by a capacitor for energy storage, a rechargeable battery, or a combination of them, and may further include a constant-voltage direct-current (DC) power supply circuit. The power source 164 may also be supplemented by a DC power generated by AC to DC regulator 166 of AC power from a commercial grid, and may further be accompanied by a DC/AC inverter to supply a residual power for domestic or local equipment.

The human interface enables modifications of the preinstalled conditions including the preinstalled threshold output power of the solar panel by users, based on observations of timings of transitions between the predetermined opened state and the closed states and the output power of the solar panel, under circumstances including seasonal changes of solar light. Such modifications make the system more user friendly and more matched with actual circumstance of use.

FIG. 4 illustrates schematically the predetermined opened position (A) and the closed position (B) of the light diffuser 130 in the embodiment of FIG. 1. The light diffuser positioner 140 is configured to stay at a bottom position of the light diffuser positioner 140 and situate the light diffuser 130 at the predetermined opened position (A), at initial condition or when the output power of the solar panel is less than the predetermined threshold for longer than a predetermined duration time and hence there is no need of blocking the direct solar right. At the predetermined opened position (A), the light diffuser 130 is configured to pass the diffusive light from an opening of the window toward interior as much as possible. An angle between the surface of the base plate 131 of the light diffuser 130 and a horizontal surface at the predetermined opened position may be configured adjustable, for example, by adjusting a length of the center vertical connection member 146.

The control unit 160 is configured to cause an upward motion of the vertical solid rod 143, rotate the light diffuser 130 to the closed position (B) of FIG. 4 by pulling the center vertical connection member 146 via the driving mechanism 150, and to hold the light diffuser 130 at the closed position (B) using the latch mechanism 153, when following two conditions are satisfied:

1) the output power of the solar panel is not smaller than the predetermined output power for longer than the predetermined duration time; and
2) the light diffuser is at the predetermined opened position.

The light diffuser 130 at the closed position (B) is configured to convert a direct solar radiation incident to the light diffuser 130 to a diffusive light toward interior direction as detailed in FIG. 5.

On the other hand, the control unit 160 releases the latch mechanism 153 and to cause the light diffuser 130 to return to the predetermined opened position when following two conditions are satisfied:

1) the output power of the solar panel lowers to a value smaller than the predetermined output power for longer than the predetermined duration time; and
2) the light diffuser is at the closed position.

Here the light diffuser 130 is configured to return to the predetermined opened position by utilizing a weight of the light diffuser positioner 140. The light diffuser 130 may be configured to utilize a driving force of the motor via the driving mechanism 150 when the power source has charged an enough energy.

FIG. 5 illustrates schematically structures and operation principle of the light diffuser 500 for a certain embodiment of the present disclosure. The light diffuser (A) includes a base plate 531 transparent for visible light and a light diffusing element 532 on interior side of the base plate. A micro surface structure 532 comprising micro concave lens structures for example, formed on a surface of the base plate 531 is configured to convert an incident direct solar radiation to diffusive lights toward interior direction by diffraction and refraction as illustrated by arrows. Such micro structures are generally known as diffractive diffusers and have applied so far for shaping a beam profile of light sources as briefed in background. The light diffuser (B) further includes a diffractive diffuser 533 made of a transparent plastic sheet and pasted on an interior side surface of the base plate in addition to the monolithic micro surface structure 532 formed on the surface facing exterior side of the base plate 531. As illustrated by arrows, the structure (B) is expected to bring a divergent refraction effect larger than that of (A). Alternatively, a transparent layer of inorganic material or compound material including $SiO_2$ or GaN formed on a surface of the base plate and with a rough surface equivalent to the concave structure may also be incorporated as the light diffusing element.

The light diffuser 500 of the smart window coverings of the present disclosure may further be configured to reflect and/or absorb an infra-red (IR) radiation by at least one of an IR reflection coating on a surface of the base plate, doping of IR absorbing metal to the base plate, or doping of IR absorbing metal oxide to the base plate. See for example, M. A. Butt, S. A. Fomchenkov, N. L. Kazanskiy, A. Ullah, R. Z. Ali, and M. Habib "Infrared reflective coatings for building and automobile glass windows for heat protection", *Proc. SPIE* 10342, *Optical Technologies for Telecommunications* 2016, 1034200 (6 Apr. 2017), the entire contents of which are incorporated herein by reference. In a hot climate area or during a hot summer season, the IR reflection would be effective for protection from heat and for reducing energy consumption for air-conditioning. However, when an IR absorption approach is incorporated, the solar powered window covering may desirably be installed into an exterior side of the window, for realizing an effective heat protection simultaneously with maximizing the introduction of diffusive light into interior. Because, heat reflected or absorbed by the light diffuser would eventually warm up interior air when installed interior side. On the other hand, in a cold winter day, introducing heat of the sun light into interior would be helpful to warm up room temperature and to reduce an energy for heating. From such perspective, it would be also an option to prepare two types of window coverings designed for hot climate or for summer season use with IR reflective coating and for cold climate or winter season use without IR reflective coating, and to choose one from the two types depending on each climate or season.

Regular window glass is known to absorb ultra violet (UV) radiation. When a thickness of the glass is larger than 6 mm, most of UV components in the solar radiations are absorbed. In a season when the interior air conditioning is not required, fresh air from an opened window is desirable. For such a purpose, the smart window covering of the present disclosure may optionally have UV blocking in combination with a thick glass plate with thickness over 6 mm as the base plate of the light diffuser. Such a window covering would satisfy both requirement of introducing the fresh outside air and blocking the direct solar radiation including reflection or absorption of IR and UV components.

FIG. 6 illustrates schematically a structure of the smart window covering 600 according to an embodiment of the present disclosure, (A) is a front view from interior at a closed position, (B) is a side view at the closed position and (C) is a side view at the predetermined opened position both to left side from section line X-X. A solar panel 620 is mounted on the bottom horizontal frame 612 and at a proximity of a window glass 601. A light diffuser 630 includes a plurality of the base plates 631 each thereof integrated with the light diffuser element 632 as detailed in FIG. 5, the plurality of the base plates 631 attached to a positioner string 643 of a light diffuser positioner 640.

The light diffuser positioner 640 includes a horizontal rod 641 attached to the upper horizontal frame 611 rotatably around a center axis of the horizontal rod 641; a reel 642 fixed to the horizontal rod 641; and the positioner string 643 made of a flexible material, wherein the driving mechanism 650 is configured to rotate the horizontal rod 641 and the reel 642 being controlled by the control unit 660. A first end of the positioner string 643 is configured to be fixed to the reel 642 and the second end of the positioner string 643 is configured to be fixed to a proximity of the bottom horizontal frame 612 at a point 660 vertically below the reel 642 to which the first end of the positioner string 643 is attached. The positioner string 643 is made of the flexible material for example, a nylon, and configured to endure repeated usages under a tension larger than a weight of the light diffuser. See, for example http://www.chemistryexplained.com/Ny-Pi/Nylon.html, the entire contents of which are incorporated herein by reference.

Referring FIG. 6 (C), the light diffuser 630 is configured to stay on the bottom horizontal frame 612 at the predetermined opened position or at an initial condition in a state folded at a gap area 662 between adjacent two of the plurality of base plates 631. The light diffuser 630 in the state folded may be configured to be installed in a casing 670 mounted on the bottom horizontal frame 612. The base plate 631 of the light diffuser 630 is in a rectangular shape with a horizontal length almost equal to but shorter than a horizontal distance between surfaces of the pair of the side frames 613, and with a vertical height smaller than a reminder of a subtraction of a thickness of the solar panel 620 from a horizontal depth D of the bottom horizontal frame 612.

Referring now to (A) and (B), the light diffuser 630 is configured to develop from a predetermined opened position (C) to the closed position illustrated by (A) and (B), by spooling of the positioner string 643, the spooling made by the rotation of the reel 642 driven by the driving mechanism 650. At the closed position (A) and (B), the light diffuser 630 is configured to cover most of an opening of the frame, where the plurality of the base plates 631 are aligned in a vertical direction with each thereof being aligned in a horizontal direction.

The light diffuser 630 is configured to return to the predetermined opened position (C) in a state folded at a gap area 662 between adjacent two of the plurality of the base plates, utilizing a weight of the light diffuser when the control unit 610 releases the latch mechanism of the driving mechanism 650. Additionally, the control unit 660 may drive the driving mechanism to rotate the reel 642 in a direction to help the light diffuser 630 return to the predetermined opened position (C).

The smart window covering of FIG. 6 may further include a guide string 644 connecting straightly and vertically the upper horizontal frame 611 and the bottom horizontal frame 612, wherein the guide string 644 is configured to pass through a plurality of support rings 645 each thereof attached to a side of a base plate, the side of the base plate facing a same side as the guide string when folded at the predetermined opened position.

The light diffuser 630 of the smart window covering of FIG. 6 may further include a spring 646, where the spring 646 is attached to adjacent two of the plurality of the base plates 631 and configured to help the plurality of the base plates 631 return to the predetermined position, namely the folded state.

The light diffuser 630 of the smart window covering of FIG. 6 may further include a diffractive diffuser sheet 633 made of plastic material and covering the gap area between the adjacent two of the plurality of the base plates, where the diffractive diffuser sheet is configured to convert the direct solar radiation incident to diffusive lights toward interior.

FIG. 7 illustrates schematically a smart window covering 700 according to an embodiment the present disclosure, (A) a front view from interior and (B) a side view from a section line X-X. A solar panel 720 is mounted on a bottom horizontal frame 712. Each of a pair of side frames 713 includes a longitudinal track 780, where the longitudinal tracks 780 of the pair of the side frames 713 face one another and each extends continuously from a bottom end 781 of the longitudinal track configured to contact the lower horizontal frame 712 to an upper end 782 of the longitudinal track located at a proximity of the upper horizontal frame 711. Here a frame for the smart window covering 710 is inserted into the frame of the window. However, the frame of the window may substitute for the upper horizontal frame and the bottom horizontal frame of the smart window, except for a pair of side frames 713 which includes the longitudinal tracks.

The light diffuser 730 includes a single base plate 731 with the light diffusing element not illustrated here but formed as described in FIG. 3. The single basic plate 731 of the light diffuser 730 has two vertical sides 783, where each of the two vertical sides 783 of the single basic plate is slidably inserted into each of the longitudinal tracks 780 of the pair of the side frames 713.

The light diffuser positioner 740 includes a horizontal rod 741 attached to the upper horizontal frame 711 rotatably around a center axis of the horizontal rod 741, a pair of reels 742 each fixed to the horizontal rod 741 at proximity of each of the pair of side frames 713; and a pair of positioner strings 743 made of a flexible material for example, a nylon, and configured to endure repeated usages under a tension larger than a weight of the light diffuser, as described in FIG. 6. A driving mechanism 750 is configured to rotate the horizontal rod 751 and the reel 752 being controlled by the control unit 760.

An end of the positioner string 743 is fixed to an upper end of the basic plate of the light diffuser at a location 733 close to one of the two vertical side of the basic plates, the other end of the positioner string is attached to one of the pair of reels 742 configured to be situated vertically above the location 733 where the end of the positioner string is fixed to the upper end of the basic plate.

The light diffuser 730 is configured to stay on the lower horizontal frame 712 at a predetermined opened position, and move to the upper end 782 of the longitudinal tracks at the closed position, where the light diffuser 730 is aligned to block the direct solar radiation incident to the light diffuser and to convert to the diffusive light when predetermined conditions are satisfied, and to return to the predetermined opened position when there is no need of blocking the direct solar radiation, with the same algorithm as detailed in FIG. 2.

The window covering illustrated in FIG. 7 is a simplified version of the present disclosure and may fit for uses in areas with a relatively cool climate or the replacing use as a winter season version where the heating effect of the sun light is preferably introduced into interior through the window. At the closed position, the light diffuser 730 of FIG. 7 allows the direct solar radiation entering into interior from a lower half portion of the window, which would be acceptable or even preferable for example in winter season in warming up interior air, while simultaneously blocking and converting the direct solar radiation incident at a higher portion of the window, which would prevent a glare and help keeping the window bright by introducing only the diffusive light.

Figure 8:
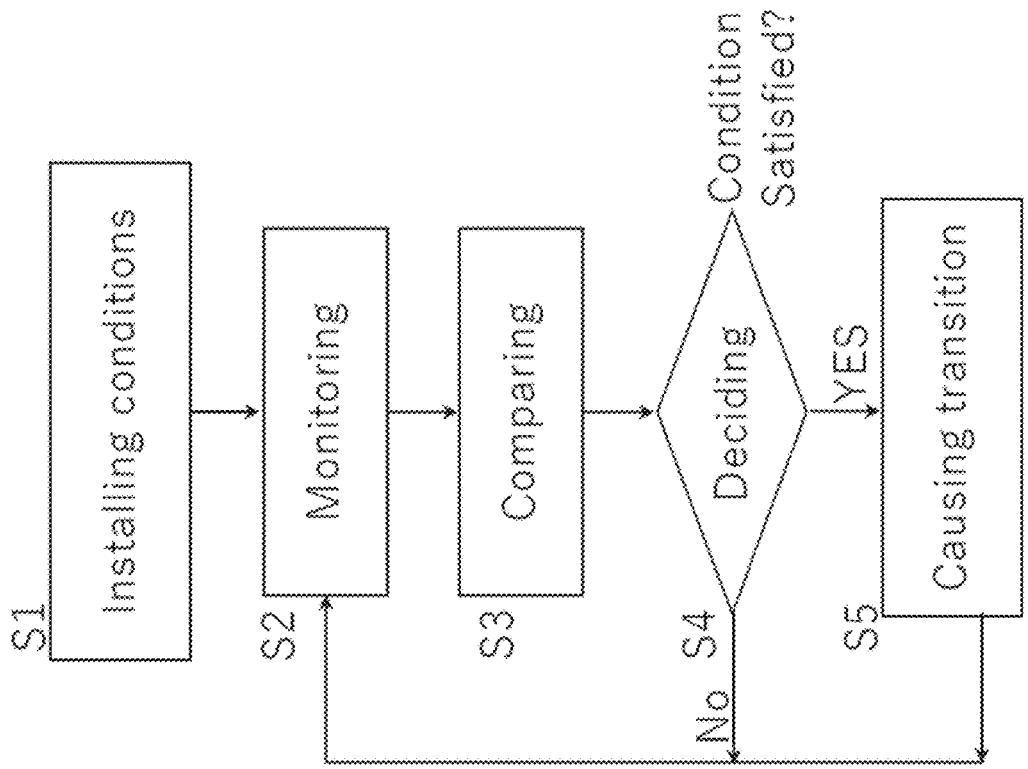
FIG. 8 is an exemplary flow chart of a controlling method for a solar powered window covering according to a certain embodiment of the present disclosure.

FIG. 8 is an exemplary flow chart of a controlling method for a solar powered window covering according to a certain embodiment of the present disclosure. The method for controlling a smart window with a light diffuser configured to be driven by a driving mechanism powered by an output power of a solar panel includes providing a predetermined condition to cause a positional transition of the light diffuser and a positional information of a predetermined opened position as an initial condition, monitoring the output power of the solar panel, comparing the output power of the solar panel with a predetermined value, making a decision whether a positional transition is necessary for the light diffuser; and either a) causing the positional transition of the light diffuser from a predetermined opened position to a closed position via the driving mechanism and updating a position information after the transition, when the output power of the solar panel is not smaller than the predetermined value for longer than a predetermined time duration while the light diffuser is at the predetermined opened position, b) causing a return of the light diffuser from the closed position to the predetermined opened position, and updating a position information after the transition, when the output power of the solar panel is smaller than the predetermined value for longer than the predetermined time duration, or c) maintaining a current position when neither of condition for a) nor condition for b) is satisfied.

A solar powered window covering which includes the features in the foregoing description provides numerous advantages. The light diffusers described in the present disclosure can block the direct solar radiation and convert it to diffusive light toward interior at the closed position. Thus, the light diffuser of the present disclosure provides a solution that provides brighter diffusive light in comparison to conventional s that block direct solar radiation. This reduces the consumption of electric energy for interior lighting. In addition, the present disclosure has the advantage of optionally revising an IR reflective layer for summer time or hot climate use. The optional IR reflective layer reduces heat flow from the window due to diffusive light during summer time, resulting in a reduction of energy for cooling. Further, the control method of the present disclosure does not require other complicated sensors for monitoring the output power of the solar panel. This feature enables adjusting of the preinstalled threshold output power of the solar panel based on an installed circumstance and seasonal changes of output power of the solar light referring the monitored output power of the solar panel. The controlling algorithm of the present disclosure realizes a more flexible and thus user-friendly system.

Obviously, numerous modifications and variations are possible in light of the above teachings. It is therefore to be understood that within the scope of the appended claims, the invention may be practiced otherwise than as specifically described herein. Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A method for controlling a smart window with a light diffuser configured to be driven by a driving mechanism powered by an output power of a solar panel, the method comprising:
   storing a predetermined condition to cause a positional transition of the light diffuser and a positional information of a predetermined opened position as an initial condition;
   monitoring the output power of the solar panel;
   comparing the output power of the solar panel with a predetermined value;
   making decision whether a positional transition is necessary for the light diffuser; and
   either
   a) causing a transition of the light diffuser from the predetermined opened position to a closed position via the driving mechanism, when the output power of the solar panel is not smaller than the predetermined value for longer than a predetermined time duration while the light diffuser is at the predetermined opened position;
   b) causing a return of the light diffuser from the closed position to the predetermined opened position when the output power of the solar panel is smaller than the predetermined value for longer than the predetermined time duration, or
   c) maintaining a current position when conditions for a) or b) is not satisfied;
   wherein the light diffuser comprises:
      a base plate transparent to visible light, and light diffusing element on the base plate, wherein the light diffuser is aligned at a predetermined opened position initially;
      a light diffuser positioner configured to move the light diffuser between the predetermined opened position and the closed position;
      wherein the driving mechanism comprises an axial rotation motor, a latch mechanism configured to latch a motion of the driving mechanism, and a transmission mechanism having a gear transmission configured to transmit the motion of the motor to the light diffuser positioner;
      wherein the solar panel is mounted on a frame of a smart window diffuser device; and
      a control unit comprising a memory, a monitor of the output power from the solar panel, a controller and a power source,
      wherein the memory is configured to store a predetermined threshold output power of the solar panel, a predetermined duration time, and a present position of the light diffuser,
      wherein the monitor is configured to receive the output power from the solar panel and send a monitor signal to the controller,
      wherein the controller is configured to control the driving mechanism, and
      wherein the power source is configured to supply an electric power required for an operation of the smart window diffuser device,
      wherein the control unit is configured to:
         move the light diffuser to the closed position via the light diffuser positioner and the driving mechanism, and to hold the light diffuser at the closed position with the latch mechanism when following two conditions are satisfied:
            1) the output power of the solar panel is not smaller than the predetermined output power for longer than the predetermined duration time; and
            2) The light diffuser is at the predetermined opened position,
         and wherein the control unit is further configured to release the latch mechanism and cause the light diffuser to return to the predetermined opened position when following two conditions are satisfied;

1) the output power of the solar panel lowers to a value smaller than the predetermined output power for longer than the predetermined duration time; and 2) The light diffuser is at the closed position, and wherein the light diffuser is configured to transmit incident direct solar radiation therethrough toward an interior direction of a building such that the solar radiation transmitted through the light diffuser is converted to a diffusive light when the light diffuser is at the closed position, and to admit the incident direct solar radiation into interior of the building without being blocked by the light diffuser when the light diffuser is at the predetermined opened position, and wherein the light diffuser includes a diffractive diffuser disposed on an interior side surface of the base plate.

2. The method of claim 1, wherein the diffuser device further comprises at least one of a capacitor for energy storage and a rechargeable battery.

3. The method of claim 2, wherein the power source is configured to be supplemented by DC power from a commercial grid.

4. The method of claim 1, wherein the diffractive diffuser is at least one of a monolithic diffractive diffuser formed monolithically on a surface of the base plate, a diffractive diffuser made of plastic sheet and pasted on a surface of the base plate, and a transparent inorganic material layer with a concave surface formed on a surface of the base plate.

5. The method of claim 4, wherein the light diffuser is further configured to reflect and/or absorb an infra-red (IR) radiation by at least one of an IR reflection coating on a surface of the base plate, doping of IR absorbing metal to the base plate, or doping of IR absorbing metal oxide to the base plate.

6. The method of claim 1, wherein the light diffuser positioner further comprises a supporting member made of a solid material; a pair of vertical solid rods with a plurality of side ports; an upper horizontal solid rod connecting the pair of vertical solid rods at upper ends thereof; and a center vertical connection member made of a solid rod or a string connecting the upper horizontal solid rod at a center portion thereof with the transmission mechanism configured to be attached to an upper horizontal frame of an exterior window, wherein the supporting member is attached to the base plate of the light diffuser at one end of the supporting member, and also connected rotatably and slidably to one of the plurality of the side ports of the vertical solid rod at the other end of the supporting member, and further rotatably attached to one of a pair of side frames of the exterior window with a pin shaft perpendicularly embedded into and fixed to the one of the pair of side frames of the exterior window at a portion between both ends of the supporting member, wherein the light diffuser positioner is configured to stay at a bottom position of the light diffuser positioner corresponding to the predetermined opened position of the light diffuser, wherein the control unit is configured to make rotate the light diffuser to the closed position by lifting the pair of vertical solid rods with the plurality of side ports up to an upper position of the light diffuser positioner by pulling by the center vertical connection member via the transmission mechanism, and wherein the light diffuser positioner is further configured to return to the bottom position of the light diffuser positioner utilizing a weight of the light diffuser positioner when the control unit releases the latch mechanism.

7. The method of claim 6, wherein each of the pair of vertical solid rods is vertically slidably connected to each of the pair of side frames at around a bottom end portion of the each of pair of the vertical solid rods with a pin shaft perpendicularly embedded into each of the pair of side frames.

8. The method of claim 1, wherein the light diffuser positioner further comprises a horizontal rod attached to an upper horizontal frame of an exterior window rotatably around a center axis of the horizontal rod; a reel fixed to the horizontal rod; and a positioner string made of a flexible material, wherein the driving mechanism is configured to be attached to the upper horizontal frame of the exterior window, and to rotate the horizontal rod and the reel being controlled by the control unit, wherein a first end of the positioner string is configured to be fixed to the reel and the second end of the positioner string is configured to be fixed to a proximity of a bottom horizontal frame of the exterior window, vertically below the reel to which the first end of the positioner string is attached, wherein the base plate of the light diffuser is in a rectangular shape with a horizontal length almost equal to but shorter than a horizontal distance between surfaces of a pair of side frames of the exterior window, and with a vertical height smaller than a reminder of a subtraction of a thickness of the solar panel from a horizontal depth of the bottom horizontal frame, wherein the light diffuser comprising a plurality of the base plates each being integrated with the light diffuser element, the plurality of the base plates attached to the positioner string, wherein the light diffuser is configured to stay on the bottom horizontal frame at the predetermined opened position in a folded state at a gap area between adjacent two of the plurality of the base plates, wherein the control unit is configured to develop the plurality of the base plates to the closed position of the light diffuser from the predetermined opened position by spooling the positioner string by rotating of the reel via the driving mechanism, wherein wherein the light diffuser is further configured to cover most of an opening of the exterior window at the closed position, the plurality of the base plates being aligned in a vertical direction with each being aligned in a horizontal direction, and return to the predetermined opened position in the folded state, utilizing a weight of the light diffuser when the controller released the latch mechanism.

9. The method of claim 8, wherein the light diffuser is configured to be installed in a bottom casing mounted on the bottom horizontal frame.

10. The method of claim 1, wherein the diffuser device further comprises a pair of side frames configured to be inserted into both sides of the an exterior window vertically, wherein each of the pair of side frames comprises a longitudinal track, wherein the longitudinal tracks of the pair of the side frames face one another and extend continuously from a bottom end of the longitudinal tracks to an upper end of the longitudinal tracks, wherein the bottom end is located at a lower horizontal frame of the exterior window, and an upper end of the longitudinal tracks located proximity of an upper horizontal frame of the exterior window, wherein the light diffuser comprises a basic plate with two vertical sides of the basic plates, wherein each of the two vertical sides of the basic plates is slidably inserted into each of the longitudinal tracks of the pair of the side frames, wherein the light diffuser positioner further comprises a horizontal rod attached to the upper horizontal frame rotatably around a center axis of the horizontal rod; a pair of reels each fixed to the horizontal rod at proximity of each of the pair of side frames; and a pair of positioner strings made of a flexible material, wherein the driving mechanism is configured be attached to the upper horizontal frame and to rotate the horizontal rod and the reel being controlled by the control unit, wherein a first end of the positioner string is fixed to an upper end of the basic plate of the light diffuser at a location close to one of the two vertical sides of the basic plates, the other end of the positioner string is fixed to one of the pair of reels configured to be situated vertically above the location where the one end of the positioner string is fixed to the upper end of the basic plate, wherein the light diffuser is configured to stay at a lowest position in the longitudinal tracks at the predetermined opened position, the control unit is configured to move the light diffuser to the upper end of the longitudinal tracks at the closed position of the light diffuser, and the light diffuser is further configured to return to the lowest position in the longitudinal tracks utilizing a weight of the light diffuser when the control unit releases the latch mechanism.

11. The method of claim 1, wherein the light diffuser positioner further comprises a supporting member made of a solid material; a pair of horizontal solid rods with a plurality of side ports; a vertical solid rod connecting the pair of horizontal solid rods at right side ends thereof; and a center horizontal connection member made of a solid rod connecting the vertical solid rod at a center portion thereof with the transmission mechanism attached to a right side frame of an exterior window, wherein the supporting member is rigidly fixed to the base plate of the light diffuser at one end of the supporting member, and also connected rotatably and slidably to one of the plurality of the side ports of the horizontal solid rod at the other end of the supporting member, and further rotatably attached to one of a pair of horizontal frames of an exterior window with a pin shaft perpendicularly embedded into and fixed to the one of pair of the horizontal frames at a portion between both ends of the supporting member, wherein the light diffuser positioner is configured to stay at an opened position of the light diffuser positioner when the light diffuser stays at the predetermined opened position, wherein the control unit is configured to make rotate the light diffuser to the closed position by pulling rightward the pair of horizontal slid rods with the plurality of side ports by the center horizontal connection member via the transmission mechanism, wherein further, wherein the light diffuser is configured to return to the predetermined opened position of the light diffuser positioner being pushed by the center horizontal connection member via the transmission mechanism when the controller releases the latch mechanism.

12. The method of claim 1, wherein the light diffuser further comprises a rectangular frame of the smart window diffuser device configured to be inserted into an exterior window.

* * * * *